Aug. 3, 1926.

C. D. NAGLE 1,594,793

COFFEE BREWER

Filed Oct. 17, 1924

Witnesses
Porter H. Flautt
E. Wehmeyer

Inventor
Clarence D Nagle
By Edwin H Samuels
Attorney

Patented Aug. 3, 1926.

1,594,793

UNITED STATES PATENT OFFICE.

CLARENCE D. NAGLE, OF BALTIMORE, MARYLAND.

COFFEE BREWER.

Application filed October 17, 1924. Serial No. 744,105.

In making coffee by the present known methods, the coffee is subjected to high temperatures which cause chemical changes producing harmful compounds and also disintegrate the grain and causing the liquid to be cloudy. The coffee is by the ordinary boiling method cooked at a temperature of 212° Fahrenheit, or even more, as the coffee sinks to the bottom of the pot, and is subject to the action of boiling water at slightly higher than atmospheric pressure, and in the more improved variety of apparatus or percolator, the coffee is subjected to the action of water at a correspondingly high temperature, the water being in this instance thrown up from the bottom of the pot by the steam pressure originated at a little over 212°, the temperature and pressure being a little higher than boiling point at atmospheric pressure, to an extent sufficient to provide for a pressure which will thus raise the water.

The coffee thus cooked contains various harmful constituents liberated by treatment of the coffee at a temperature above 200° where chemical changes take place, producing undesirable chemical compounds other than caffein, substances which are not present until the temperature passes above 200° Fahrenheit. These compounds are understood to produce the various unfavorable results of coffee drinking, i. e., headache, nervousness and biliousness.

The present invention relates to an apparatus for treating coffee whereby it may be well and thoroughly cooked or brewed, obtaining a solution of coffee which retains all the flavor and aroma of the coffee and has the stimulating properties of caffein without containing the undesirable ingredients and properties.

The apparatus consists of an outer casing or receptacle for water to be directly subjected to the heat of the fire or other source of heat, the receptacle being open to the atmosphere so that it cannot generate a pressure in excess of atmosphere and therefore cannot heat the water over the boiling point at atmospheric pressure.

Suspended in this container and partially submerged in the water therein and spaced away from the heated portion thereof, is a second container in which the coffee solution is brewed. This container is preferably of conducting metal and to a considerable extent exposed to the atmosphere, so that the temperature of the water or solution therein cannot, owing to the fact that only a portion of it is subjected to a maximum temperature of 212° and further owing to the loss of heat due to the exposure of the container to the atmosphere, reach a temperature of 200°, the average temperature of the liquid in the inner container, after heating for an unlimited and indefinite period, being 195 to 198°. This inner container is provided with a pouring nozzle, a cover with means for closing the nozzle to prevent undue loss of heat and retardation of cooking, and a depressor preferably integral with the cover whereby the dry coffee grain is at the beginning of the cooking operation immediately forced down under the water, causing it to become saturated, avoiding the loss of time consumed in the ordinary boiling process in moistening the coffee before it actually enters into contact with the liquid, so that the cooking or solution-forming operation begins.

In the accompanying drawing I have illustrated a coffee brewer embodying the features of my invention in the preferred form.

In the drawings—

Figure 1:
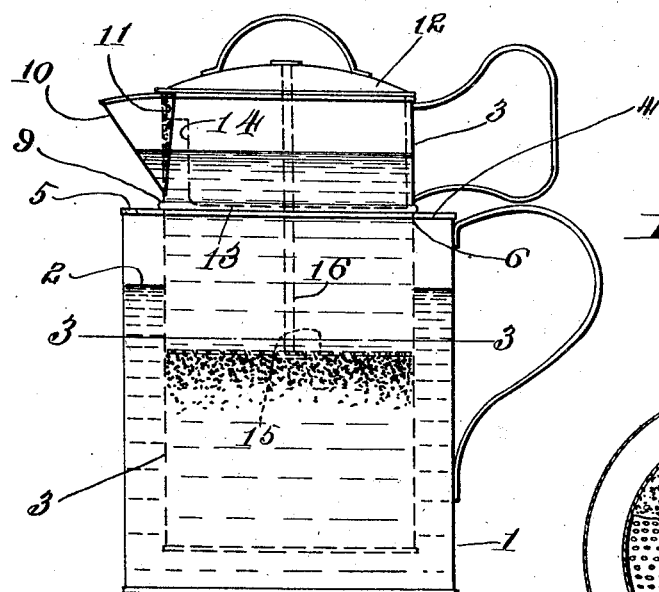
Figure 1 is a side elevation more or less diagrammatic in that it treats the members as transparent, showing the position of the liquid and solid materials and the relations of the parts.
Figure 3:
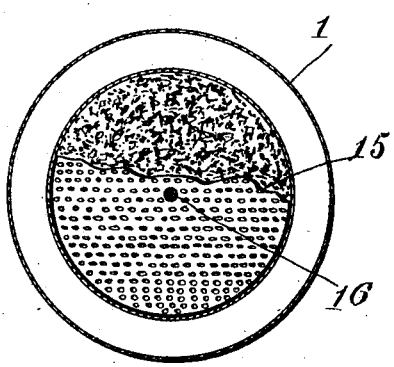
Figure 3 is a section on the line 3, 3 of Figure 1, the depressor being broken away on one side to show the coffee underlying it.
Figure 2:
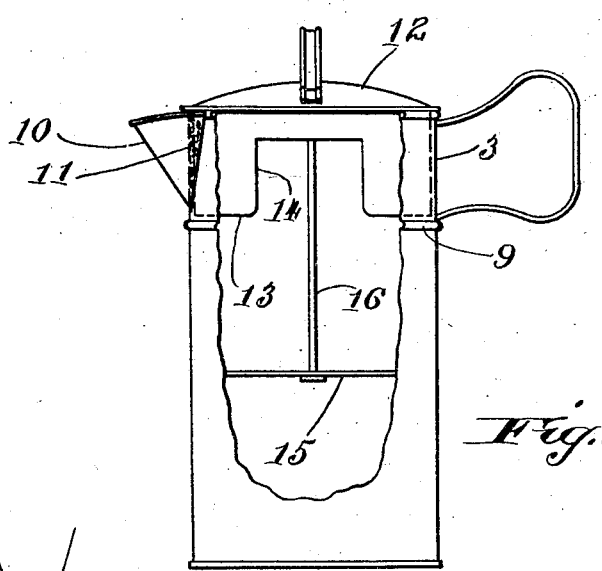
Figure 2 is an elevation of the coffee pot or inside receptacle removed from the outside receptacle and broken away to show the internal arrangement.

Referring to the drawings by numerals, each of which is used to designate the same or similar parts in the different figures, the apparatus consists of an outside container or casing 1 intended to be subjected to direct contact with the source of heat and containing water at 2 as a heat transferring medium and having suspended therein an inner container or coffee pot 3.

More specifically described, the outer casing or container 1 is partially closed at the top, having a top wall 4 in which is formed a small aperture 5 in the nature of a vent to avoid accumulation of pressure and consequent increase of temperature of the water above boiling point. This top wall 4 is also provided with a large central aperture 6 in which is seated the inner container or coffee pot 3, the latter having a circumferential rib 9 projecting from its side surface spaced from the bottom by an interval equal to about two-thirds to three-fourths of the height of the inner container. This inner container or pot 3 is also provided with a pouring nose or nozzle 10, fed by perforations 11 in the side of the pot near the top and in the area enclosed by the nozzle or spout, and is closed at the top by means of a cover 12 having a wide depending flange 13 which fits inside the pot and which is slotted at 14, the slot being of sufficient width to expose the perforations when it registers with the perforated area which serves as a spout opening, the cover being preferably rotatable so that it may be turned to throw the slot out of registration with this perforated area, thus closing the perforations. The cover also supports the depressor 15 in the form of a horizontal perforated plate of an area equal and corresponding in shape to the horizontal cross-section of the inner container or pot. This depressor in the form of the invention shown is suspended from the cover by means of a rod 16 secured at one end to the centre of the depressor and at the other end to the centre of the cover, the rod being of sufficient length in the form of the invention shown to space the depressor downwardly from the cover by a distance equal to half or a little more than half the depth of the pot, the object being to submerge the coffee even when the minimum amount of liquid is used.

It is of particular importance that the parts shall be so arranged that the steam can escape freely from the bottom container and that the pot be so suspended as to keep it out of contact with the heated walls of the outer container, and it is desirable to have the inner container or pot of conducting material and to have it extend well above the outer container so that there will be sufficient cooling effect to prevent the water in the pot at any and all times from attaining a temperature of 200° Fahrenheit.

In the operation of the device a suitable amount of water, preferably hot, being placed in the outer container or casing, the necessary charge of coffee or tea and water, for tea may be made in substantially the same manner, is placed in the inner container or pot, and the cover being replaced and turned to make the pot air-tight, the depressor being at the same time moved down into the liquid engaging the floating coffee or tea, forcing this material downward into a mid-position in the liquid so that it is immediately saturated, the pot thus charged is inserted in the outer container or casing which is a little less than half filled with water, the latter being placed in contact with the source of heat and thus heated as long as may be convenient or desirable. Cooking for an unlimited time results in no disadvantage so long as a supply of water is maintained in the outer container. Either cold or warm water may be placed in the inside container. Boiling water is never used in the inside receptacle. If cold water be used, and the full number of cups of coffee be made, it will take about twenty minutes to make strong coffee. If warm water be used in the inside receptacle, less time will be consumed.

The important features of the invention are that the water in the inner receptacle or coffee pot cannot reach a temperature over 198°. This prevents the formation of harmful compounds and also the breaking up of the coffee which would form sediment or cloud the coffee, so that the coffee produced is always clear and relatively harmless, and the operation of the device requires no skill or knowledge of coffee making, as unlimited cooking in this way at the temperature thus attained will not harm the coffee or change it after it has reached its full strength.

I have thus described specifically and in detail my coffee brewing apparatus in order that the nature and operation of the same may be fully understood; however, the specific terms herein are used descriptively rather than in a limiting sense, the scope of the invention being defined in the claim.

What I claim and desire to secure by Letters Patent is:—

In a coffee brewing apparatus, an outer receptacle for water to be placed in direct contact with the source of heat, an inner receptacle for coffee and water with means for suspending the inner receptacle within the outer receptacle out of contact with the heated surface, the outer receptacle having means for free escape of steam, the inner receptacle having a cover and a depressor plate suspended from the cover with means for spacing the same well down into the liquid, the inner receptacle having a spout for pouring and the cover having a flange with a slot adapted to register with said opening to open the spout, the cover being adapted for rotation so that the slot may be thrown out of registration with the spout to close the opening and make the pot air-tight.

Signed by me at Baltimore, Maryland, this 15th day of October, 1924.

CLARENCE D. NAGLE.